United States Patent
Wu et al.

(10) Patent No.: US 6,700,991 B1
(45) Date of Patent: Mar. 2, 2004

(54) HIDDEN DIGITAL WATERMARKS IN IMAGES

(75) Inventors: Ja-Ling Wu, Taipei (TW); Chiou-Ting Hsu, Taipei (TW)

(73) Assignee: Cyberlink Corporation, Taipei (TW)

( * ) Notice: Subject to any disclaimer, the term of this patent is extended or adjusted under 35 U.S.C. 154(b) by 0 days.

(21) Appl. No.: 09/520,058

(22) Filed: Mar. 7, 2000

(30) Foreign Application Priority Data

Jul. 16, 1999 (TW) ........................................ 88112076 A

(51) Int. Cl.[7] .............................. G06K 9/00; G06K 9/46
(52) U.S. Cl. ....................................... 382/100; 382/250
(58) Field of Search .................................. 382/100, 250

(56) References Cited

U.S. PATENT DOCUMENTS

| | | | | |
|---|---|---|---|---|
| 5,208,857 A | * | 5/1993 | Lebrat | 380/217 |
| 5,323,187 A | * | 6/1994 | Park | 375/240.04 |
| 5,809,139 A | * | 9/1998 | Girod et al. | 380/202 |
| 5,864,649 A | * | 1/1999 | Shima | 386/124 |
| 5,930,369 A | * | 7/1999 | Cox et al. | 380/54 |
| 6,185,312 B1 | * | 2/2001 | Nakamura et al. | 382/100 |
| 6,240,121 B1 | * | 5/2001 | Senoh | 375/130 |
| 6,285,775 B1 | * | 9/2001 | Wu et al. | 382/100 |
| 6,317,767 B2 | * | 11/2001 | Wang | 708/401 |
| 6,373,974 B2 | * | 4/2002 | Zeng | 382/135 |
| 6,560,370 B2 | * | 5/2003 | Ribas-Corbera et al. | 382/239 |

OTHER PUBLICATIONS

Bender et al., "Techniques for data hiding", Massachusetts Institute of Technology, Media Library, pp. 1–23, 1996.

Brassil et al., "Electronic Marking and Identification Techniques to Discourage Document Copying", IEEE Journal on Selected Areas in Communications, vol. 13, pp. 1495–1504, Oct. 1995.

Bruyndonckx et al., "Spatial Method for Copyright Labeling of Digital Images", pp. 456–459.

Cox et al., "Secure Spread Spectrum Watermarking for Multimedia", pp. 1–33, NEC Research Institute.

Koch et al., "Towards Robust and Hidden Image Copyright Labeling", pp. 452–455, Fraunhofer Institute of Computer Graphics.

Pitas et al., "Applying SIgnatures on Digital Images", pp. 460–463.

Swanson et al., "Transparent Robust Image Watermarking", pp. 211–214, IEEE, 1996.

Walton, "Image Authentication for a Slippery New Age", pp. 18, 19, 20, 22, 24, 26, 82, 84–87, Dr. Dobb's Journal, Apr. 1995.

* cited by examiner

Primary Examiner—Leo Boudreau
Assistant Examiner—Hussein Akhavannik
(74) Attorney, Agent, or Firm—Fish & Richardson P.C.

(57) ABSTRACT

An image authentication method by embedding digital watermarks into images, comprising: providing an original image and a watermark image; applying pseudo-random permutations to the watermark image for generating a dispersed watermark image; applying block-based permutations to the original image and the dispersed watermark image in order to form a plurality of original image blocks with each of the watermark blocks dispersed over the corresponding image block only; applying FDCT (Forward Discrete Cosine Transform) on each of the original image blocks independently so that each of the original image blocks is transformed into a DCT coefficient block that corresponds to different frequency ranges; embedding said watermark image blocks into said DCT coefficient blocks, in order to form a plurality of combined DCT coefficient blocks; applying IDCT (Inverse Discrete Cosine Transform) to the combined DCT coefficient blocks to form an embedded watermark image.

10 Claims, 9 Drawing Sheets

Fig. 8A

| 16 | 11 | 10 | 16 | 24 | 40 | 51 | 61 |
|----|----|----|----|----|----|----|----|
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

Fig. 8B

| 8 | 6 | 5 | 8 | 12 | 20 | 26 | 31 |
|---|---|---|---|----|----|----|----|
| 6 | 6 | 7 | 10 | 13 | 29 | 30 | 28 |
| 7 | 7 | 8 | 12 | 20 | 29 | 35 | 28 |
| 7 | 9 | 11 | 15 | 26 | 44 | 40 | 31 |
| 9 | 11 | 19 | 28 | 34 | 55 | 62 | 39 |
| 12 | 18 | 28 | 32 | 41 | 52 | 57 | 46 |
| 25 | 32 | 39 | 44 | 52 | 61 | 60 | 51 |
| 36 | 47 | 48 | 49 | 56 | 50 | 52 | 50 |

HIDDEN DIGITAL WATERMARKS IN IMAGES

BACKGROUND OF THE INVENTION

1. Field of the Invention

The present invention relates to a digital watermark; more specifically, the invention relates to a method of providing hidden digital watermarks in images.

2. Description of Related Art

Due to the rapid and extensive growth of electronic publishing industry, issues regarding protection of copyright have become increasingly important, in a large part because digital data in media form is easily copied and manipulated. One potential solution for claiming the ownership of a digital image is to use electronic stamps or so-called watermarks, which are embedded into the images, wherein the watermarks containing the copyright information should be added to the original digital image data without being perceptually visible to the viewers.

In order to achieve the above objects, conventional technologies provide an image authentication technique by embedding digital watermarks into original images. Details regarding technologies of this sort, which are still being developed, are disclosed in "Electronic marking and identification techniques to discourage document copying" by J. T. Brassil, S. Low, N. F. Maxemchuk, and L. O'Gorman, pp. 1495–1504, IEEE J. Select. Areas Commum., vol. 13, October 1995; there different encoding methods are mentioned in the document to conceal digital markings in a document. Furthermore, related publications including "Applying signatures on digital images" by I. Pitas and T. H. Kaskalis, pp. 460–463, in Proc. IEEE Nonlinear Signal and Image Processing, June 1995; "Spatial method for copyright labeling of digital images" by O. Bruyndonckx, J. J. Quisquater, and B. Macq, pp. 456–459, in Proc. IEEE Nonlinear Signal and Image Processing, June 1995; "Image authentication for a slippery new age" by S. Walton, pp. 18–26, Dr. Dobb's Journal, April 1995; and "Techniques for data hiding" by W. Bender, D. Gruhl, and N. Morimoto, p. 40, Proc. SPIE, vol. 2420, February 1995 are conventional technologies to provide digital watermarks in spatial domain.

However, while technologies for concealing added information in digital data are readily available, it is difficult to make sure that the digital watermarks survive common digital image processing operations such as image compression (as in JPEG format), change of geometry (for example, image cropping, ornamental change, etc.), D/A-A/D converting (for example, scanning on a printout), noise interference, and so forth, with the biggest challenge of all being maintaining the watermark on a reduced image after a lossy data compression that eliminates secondary information. A technology for providing digital watermarks in a frequency domain, which superimposes a copyright code and its random sequence of locations for embedding on the image based on a JPEG model, is also readily available, as disclosed in "Toward robust and hidden image copyright labeling" by E. Koch and J. Zhao, pp. 452–455, in Proc. IEEE Nonlinear Signal and Image Processing, June 1995; "Secure spread spectrum watermarking for multimedia" by I. J. Cox, J. Kilian, T. Leighton, and T. Shammoon, in Tech. Rep. 95–10, NEC Res. Inst., Princeton, N.J., 1995, and "Transparent robust image watermarking" by M. D. Swanson, B. Zhu, and A. H. Tewfik, pp. 211–214, in Proc. ICIP '96, etc.

However, the above-mentioned conventional technologies do not take into consideration the embedding of the digital watermarks with visible recognizable patterns such as signatures in the forms of Chinese characters and personal seals.

SUMMARY OF THE INVENTION

In order to improve on the aforementioned technical shortcomings and inadequacies, the present invention is related to a method of providing hidden digital watermarks in images, comprising: providing an original image and a watermark image; applying pseudo-random permutations to the watermark image for generating a dispersed watermark image; applying block-based permutations to the original image and the dispersed watermark image in order to form a plurality of original image blocks with each of the watermark blocks dispersed over the corresponding image block only; applying FDCT (Forward Discrete Cosine Transform) on each of the original image blocks independently so that each of the original image blocks is transformed into a DCT coefficient block that corresponds to different frequency ranges; embedding said watermark image blocks into said DCT coefficient blocks, which are the original image blocks of specified frequency range, in order to form a plurality of combined DCT coefficient blocks; applying IDCT (Inverse Discrete Cosine Transform) to the combined DCT coefficient blocks to form an embedded watermark image.

BRIEF DESCRIPTION OF THE DRAWINGS

Other objects, features, and advantages of the present invention will become apparent from the following detailed description of the preferred but non-limiting embodiment. The description is made with reference to the accompanying drawings in which:

FIG. 8A and FIG. 8B shows samples of JPEG quantization table.

DETAILED DESCRIPTION OF THE PREFERRED EMBODIMENT

It is an object of the present invention to provide a method of embedding hidden digital watermarks in images. First of all, the watermark is generated as a binary pattern, and then permuted to disperse the spatial relationship and to increase the invisibility based on the characteristics of images, whereas the watermark is embedded into the middle-frequency range of the original image to invisibly embed the watermark that can survive the lossy data compression. Further, watermarks are embedded by modifying the middle-frequency coefficients within each image block of the original image in considering the effect of quantization. The following is a detailed watermark embedding steps.

(1). Watermark Embedding Steps

Figure 1A:
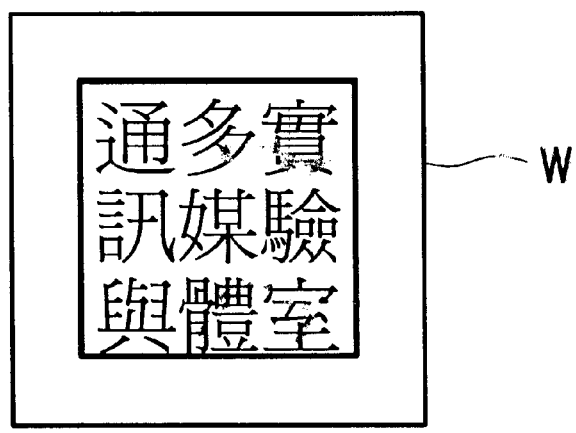
FIG. 1A shows a watermark image with a seal in Chinese.
Figure 1B:
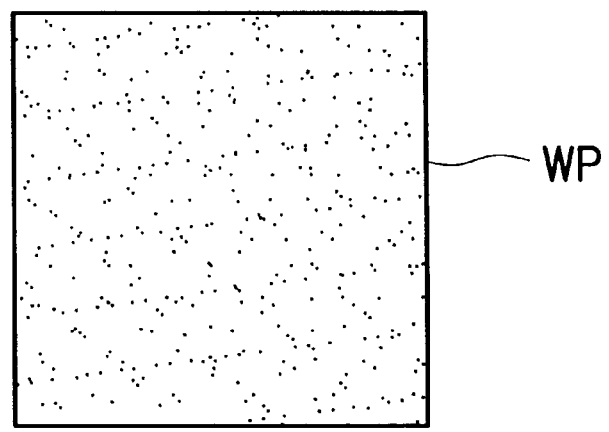
FIG. 1B shows a dispersed image of a digital water mark.
Figure 5A:
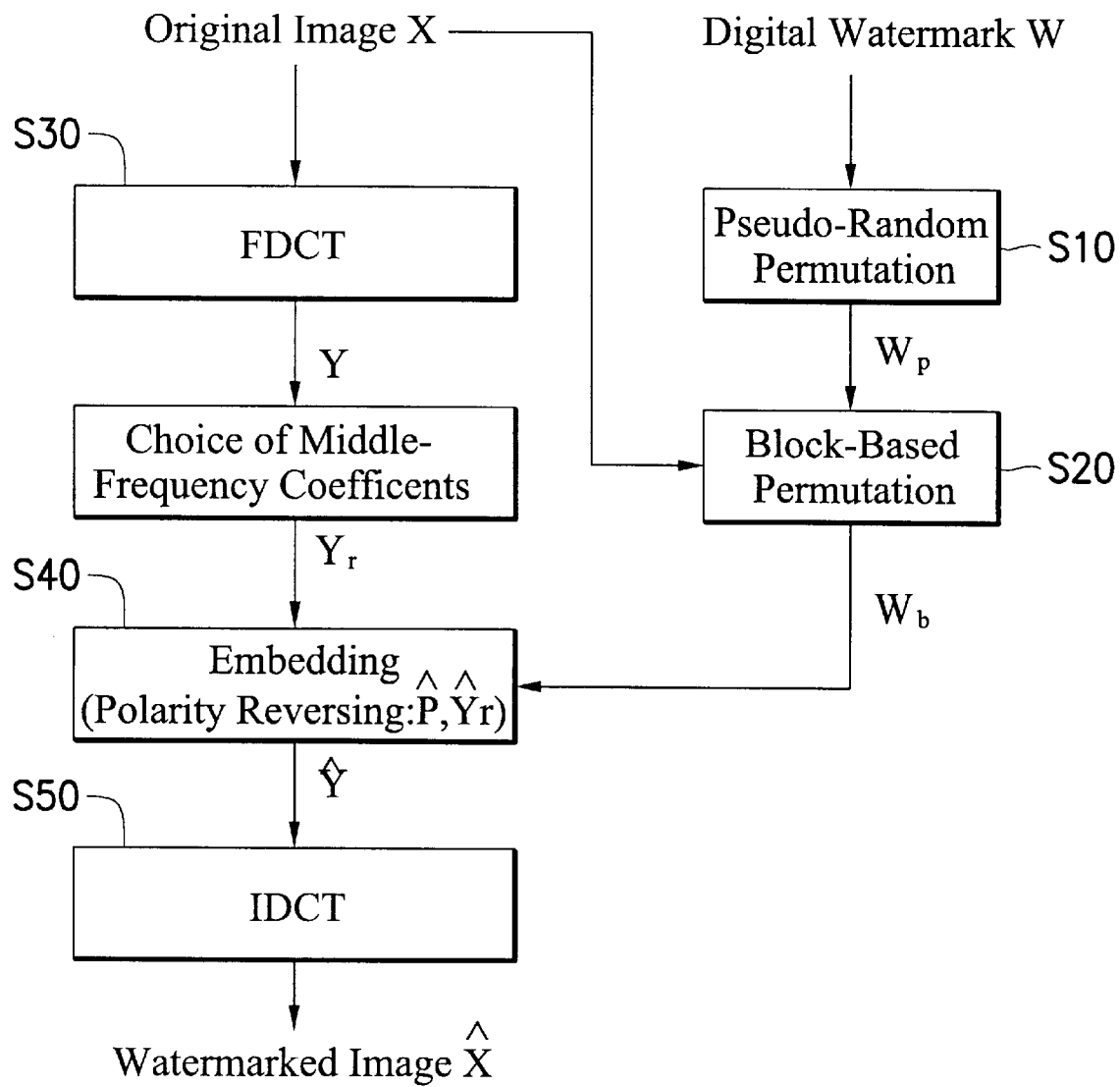
FIG. 5A and FIG. 5B illustrate the steps of embedding the watermark into the original image according to an embodiment of the present invention.
Figure 5B:
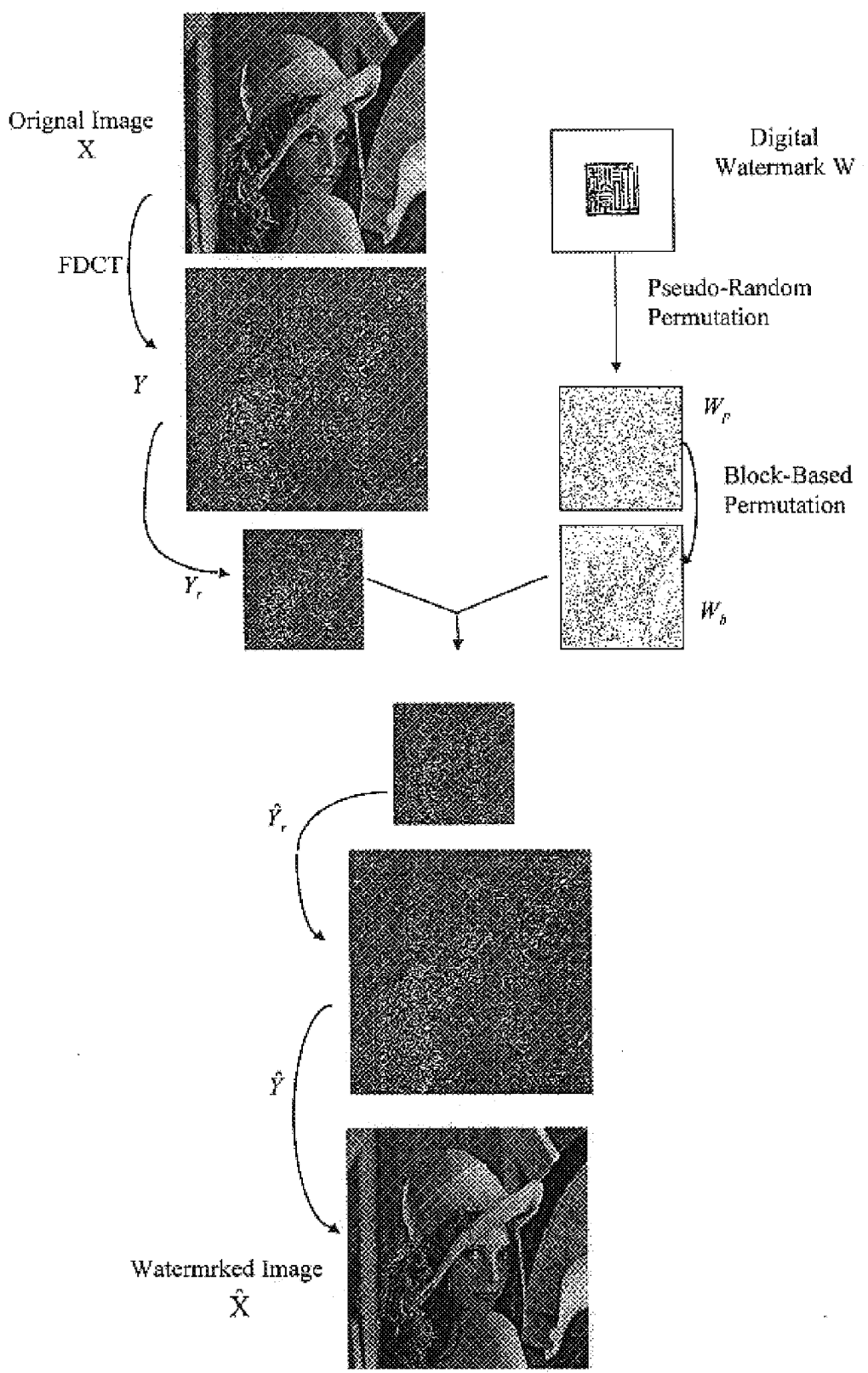

Referring to FIG. 5A and FIG. 5B, in this embodiment, digital watermark data generated are binary image data with visually recognizable patterns embedded into the original images, which have meaning to the viewers. The seal in Chinese, of FIG. 1A, and the watermark image, of FIG. 5B are both examples of such watermark data. In most of the previous arts, the watermark is a symbol or a random number comprising a sequence of bits, which are visually unidentifiable. The digital watermarks according to the present invention are more intuitive for representing one's identity than a sequence of random numbers is in the prior art. This feature is especially useful for people in the Asian countries who are used to stamps and personal seals to represent one's identity, a feature not provided by previous digital watermarking technologies developed elsewhere.

Furthermore, in this embodiment, each original image X and each watermark image W are transformed into blocks; that is, each watermark block is embedded into the middle-frequency range of each image block using block-transform instead of full-frame transform. Therefore, each watermark block will only be dispersed over its corresponding image block, instead of the entire spatial image.

The original copyrighted images X and the digital watermark images W for identification can be input to an image processor for processing through a scanner, where X is the original gray-level image of size $N_1 \times N_2$, and the digital watermark W is a binary image of size $M_1 \times M_2$. In the watermark, the marked pixels are valued as one's, and the others are zero's. Since only the middle-frequency range of the host image will be processed during the watermark embedding, the resolution of a watermark image W is assumed to be smaller that of the original image X. For example, for each 8×8 image block, only $$\left(64 \times \frac{M_1 \times M_2}{N_1 \times N_2}\right)$$

coefficients will be used for the watermark embedding, The ratio of $(M_1 \times M_2)$ and $(N_1 \times N_2)$ determines the amount of information to be embedded into the original image. The original image X and digital watermark W are represented as:

$$X=\{x(i, j), 0 \leq i < N_1, 0 \leq j < N_2\}$$

where $x(i, j) \in \{0, \ldots, 2^L-1\}$ is the intensity of pixel $(i, j)$ and L is the number of bits used in each pixel;

$$W=\{w(i, j), 0 \leq i < M_1, 0 \leq j < M_2\}$$

where $w(i, j) \in \{0,1\}$.

In X, there are $$\frac{N_1}{8} \times \frac{N_2}{8}$$

image blocks with size 8×8. To obtain the same number $$\frac{N_1}{8} \times \frac{N_2}{8}$$

of blocks as the image X, the watermark W is decomposed into several blocks with size $$\left(M_1 \times \frac{8}{N_1}\right) \times \left(M_2 \times \frac{8}{N_2}\right).$$

For example, if $M_1=N_1/2$ and $M_2=N_2/2$, the block size of the watermark block is 4×4, and if $M_1=N_1/4$ and $M_2=N_2/4$, the block size of the watermark block is 2×2. The extra columns and rows might be added to complete each image and watermark block.

Figure 2:
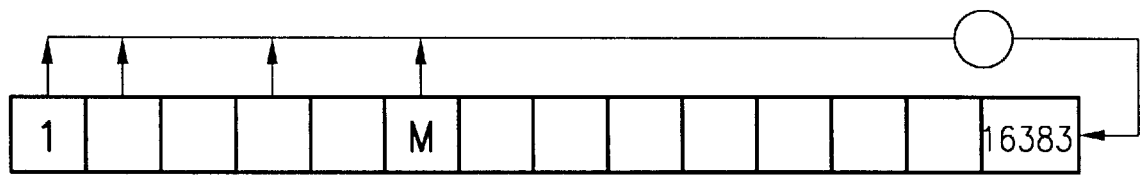
FIG. 2 is a schematic drawing of a 14-bit linear sequence generator.
Figure 3:
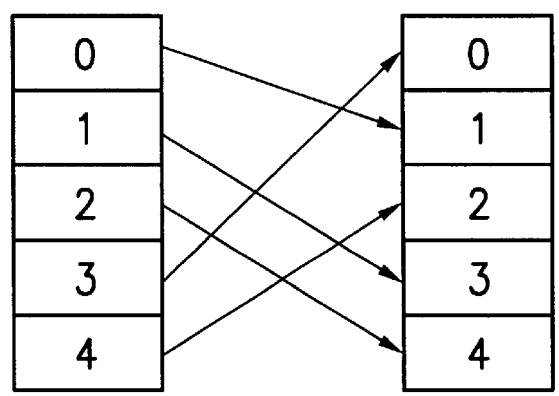
FIG. 3 shows the corresponding relationship between original image blocks and watermark blocks according to an embodiment of the present invention.

Step S10: Pseudo-Random Permutation of the Watermark:

Referring to FIG. 2 and FIG. 3 now, in order to avoid the influence of the watermark on the original image due to the spatial relationship, and to increase the invisibility based on the characteristics of the original images, the watermarks are permuted before being embedded to the original images to disperse the spatial relationship through the use of a pseudo-random number generator comprised in a shift register. The permutation is implemented as the following:

(a) number each pixel from zero to $(M_1 \times M_2)$;
(b) generate each number in random order;
(c) generate the coordinate pairs by mapping the random sequence number into a 2-D sequence.

And the formula is represented as:

$$W_p=\text{Permute}(W)$$

$$W_p=\{w_p(i, j)=w(i', j'), 0 \leq i, i' < M_1 \text{ and } 0 \leq j, j' < M_2\}'$$

where pixel $(i', j')$ is permuted to pixel $(i, j)$ in a pseudo-random order.

For example, for a digital watermark of size 128×128, use a "linear feedback shift register" [11] to generate a random sequence from 1 to 16383. Then, for each sequence element number M, compute (N div 128) and (M mod 128) as the permuted vertical and horizontal coordinates.

Step S20: Block-Based Image-Dependent Permutation of the Watermark:

In order to improve the perceptual invisibility, the characteristics of the original image should be considered. For example, the modifications of high frequencies or high luminance regions are less perceptible; thus, such image-dependent properties can be used to shuffle the pseudo-random permuted watermark to fit the sensitivity of human eyes.

For example, as shown by Table One, for each image block of size 8×8, the variances (which is used as a measure of invisibility under watermark embedding) are computed and sorted; then as shown by Table Two, for each watermark block of size $$\left(M_1 \times \frac{8}{N_1}\right) \times \left(M_2 \times \frac{8}{N_2}\right),$$

the amount of information (i.e. the number of signed pixels) are sorted also. Then, shuffle each watermark block into the spatial position according to the corresponding sorting order of the image block, i.e., $W_b=\text{Permute}(W_p)$; in which $$W_p = \left\{ w_p\left(k \times \left(M_1 \times \frac{8}{N_1}\right) + i, l \times \left(M_2 \times \frac{8}{N_2}\right) + j\right), \right.$$

$$0 \le k < \frac{N_1}{8}, 0 \le l < \frac{N_2}{8}, 0 \le i < \left(M_1 \times \frac{8}{N_1}\right), 0 \le j <$$

$$\left. \left(M_2 \times \frac{8}{N_2}\right)\right\}$$

and $$W_b = \left\{ w_b\left(k \times \left(M_1 \times \frac{8}{N_1}\right) + i, l \times \left(M_2 \times \frac{8}{N_2}\right) + j\right)\right.$$

$$= w_p\left(k' \times \left(M_1 \times \frac{8}{N_1}\right) + i, l' \times \left(M_2 \times \frac{8}{N_2}\right) + j\right),$$

$$0 \le k, k' < \frac{N_1}{8}, 0 \le l, l' < \frac{N_2}{8}, 0 \le i < \left(M_1 \times \frac{8}{N_1}\right), 0 \le j <$$

$$\left. \left(M_2 \times \frac{8}{N_2}\right)\right\},$$

where block (k',l') is shuffled to block (k,l) by the block-based permutation.

TABLE ONE

| Index of Image Block | Variances |
|---|---|
| 4 | 33.2 |
| 0 | 30.5 |
| 3 | 22.2 |
| 1 | 16.7 |
| 2 | 8.2 |

TABLE TWO

| Index of Watermark Block | Signed Pixels No. |
|---|---|
| 2 | 10 |
| 3 | 8 |
| 1 | 7 |
| 0 | 3 |
| 4 | 2 |

Step S30: FDCT Transformation:

Since the DCT used by JPEG is performed on blocks of 8×8, the input image X is divided into blocks of 8×8, and each block is DCT transformed independently. That is,

Y=FDCT(X), where FDCT denotes the operation of forward DCT.

Choice of Middle-Frequency Coefficients:

The human eyes are more sensitive to noise in lower frequency components than in higher frequency ones. However, the energy of most natural image is concentrated on the lower frequency range, and the information hidden in the higher frequency components might be discarded after the quantization operation of lossy compression. In order to invisibly embed the watermark which can survive lossy data compressions, a reasonable trade-off is to embed the watermark into the middle-frequency range of the image. To this end, for each 8×8 image block, only $$\left(64 \times \frac{M_1 \times M_2}{N_1 \times N_2}\right)$$

coefficients are selected out of the 64 DCT coefficients. Those selected coefficients are then mapped into a reduced image block of size $$\left(M_1 \times \frac{8}{N_1}\right) \times \left(M_2 \times \frac{8}{N_2}\right).$$

That is, the middle-frequency coefficients selected from the image of size ($N_1 \times N_2$) are collected to compose a reduced image of size ($M_1 \times M_2$), which has the same resolution with the binary watermark.

$Y_r$=Reduce (Y), where $$Y = \left\{ y(k \times 8 + i, l \times 8 + j), 0 \le k < \frac{N_1}{8}, 0 \le l < \frac{N_2}{8}, 0 \le i < 8, 0 \le j < 8 \right\}$$

and $$W_r = \left\{ y_r\left(k \times \left(M_1 \times \frac{8}{N_1}\right) + i', l \times \left(M_2 \times \frac{8}{N_2}\right) + j'\right), \right.$$

$$0 \le k < \frac{N_1}{8}, 0 \le l < \frac{N_2}{8}, 0 \le i' < \left(M_1 \times \frac{8}{N_1}\right), 0 \le j' <$$

$$\left. \left(M_2 \times \frac{8}{N_2}\right)\right\}.$$

Figures 4A, 4B:
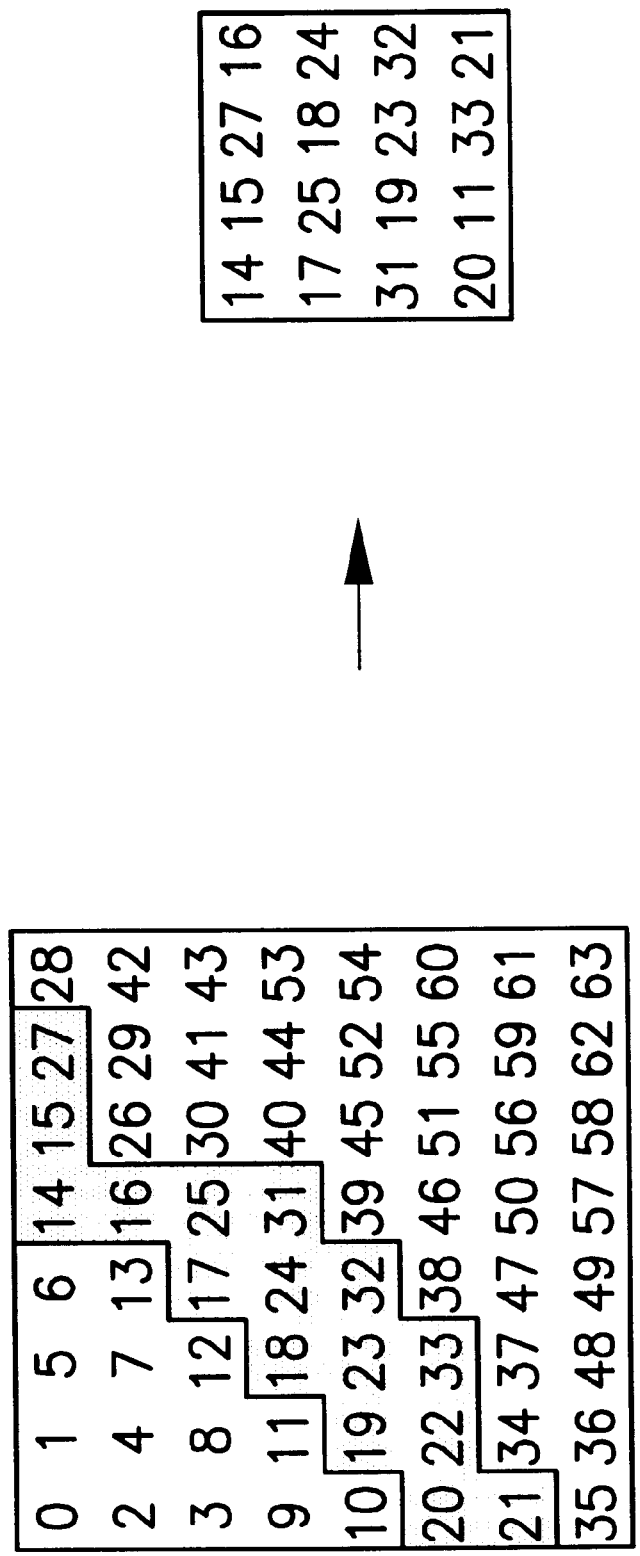
FIG. 4A and FIG. 4B show an example of defining the middle-frequency coefficients whereby DCT coefficients are embedded into the original image blocks according to an embodiment of the present invention.

For example, and referring to FIG. 4A and FIG. 4B, if $M_1=N_1/2$ and $M_2=N_2/2$, only 16 DCT coefficients are processed during the watermark embedding, and the other 48 DCT coefficients are left unchanged. FIG. 45 exemplifies our definition of the middle-frequency coefficients which are mapped into a reduced block of size 4×4.

Step S40: Embedding:

Next, a permuted digital watermark and a reduced image (which contains only the middle-frequency components of the original image) both with size ($M_1 \times M_2$) are obtained. For each watermark block of size $$\left(M_1 \times \frac{8}{N_1}\right) \times \left(M_2 \times \frac{8}{N_2}\right),$$

the reduced image block of size $$\left(M_1 \times \frac{8}{N_1}\right) \times \left(M_2 \times \frac{8}{N_2}\right)$$

at the corresponding spatial position will be modified adequately to embed the watermarked pixels.

Figure 7:
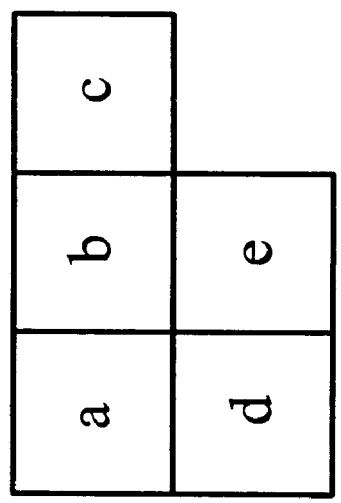
FIG. 7 shows a schematic drawing of a 2-D residual mask according an embodiment of the present invention.

(a) Embedding Into the Relationship Between Neighboring Blocks:

As shown by FIG. 7, a 2-D residual mask is used to compute the polarity of the chosen middle-frequency coefficients between neighboring blocks. For example, in FIG. 7, if a=b=c=0, d=−1, e=1, then the polarity is a binary pattern (0 or 1) which represents the coefficients at the position of the current reduced-block is larger (polarity=1) or less (polarity=0) than the coefficient at the corresponding position of the previous reduced-block. That is, P=Polarity ($Y_r$)

$$P = \left\{ p\left(k \times \left(M_1 \times \frac{8}{N_1}\right) + i, l \times \left(M_2 \times \frac{8}{N_2}\right) + j\right),\right.$$

$$0 \le k < \frac{N_1}{8}, 0 \le l < \frac{N_2}{8}, 0 \le i < \left(M_1 \times \frac{8}{N_1}\right), 0 \le j <$$

$$\left.\left(M_2 \times \frac{8}{N_2}\right)\right\}'$$

where $$p\left(k \times \left(M_1 \times \frac{8}{N_1}\right) + i, l \times \left(M_2 \times \frac{8}{N_2}\right) + j\right) =$$

$$\begin{cases} 1, & \text{if } y_r\left(k \times \left(M_1 \times \frac{8}{N_1}\right) + i, l \times \left(M_2 \times \frac{8}{N_2}\right) + j\right) > \\ & y_r\left((k-1) \times \left(M_1 \times \frac{8}{N_1}\right) + i, (l-1) \times \left(M_2 \times \frac{8}{N_2}\right) + j\right) \\ 0, & \text{otherwise} \end{cases}$$

After the binary polary polarity pattern is obtained, for each marked pixel of the permuted watermark, modify the DCT coefficients according to the residual mask to reverse the corresponding polarity. That is, $$\hat{P} = XOP(P, W_b)$$

$$\hat{P} = \{\hat{p}(i,j), 0 \le i < M_1 \text{ and } 0 \le j < M_2\},$$

where $$\hat{p}(i, j) = \begin{cases} 1 - p(i, j), & \text{if } w_b(i, j) = 1 \\ p(i, j), & \text{if } w_b(i, j) = 0 \end{cases} = p(i, j) \oplus w_b(i, j).$$

Then, construct $\hat{Y}_r$ from $\hat{P}$ such that the differences between $\hat{Y}_r$ and $Y_r$ are minimized or smaller than a user specified threshold:

$$\hat{Y}_r = \text{Expand}(\hat{P})$$

$$s.t. \sum_{i,j} (y_r(i, j) - \hat{y}_r(i, j))^2 < \text{threshold}.$$

Note that, the "Expand" operation constructs $\hat{Y}_r$ based on polarity $\hat{P}$. For example, assign the initial coefficient $\hat{y}_r(i_0, j_0) = y_r(i_0, j_0)$, and add (or subtract) the coefficients of neighboring blocks according to the residual mask in order to match the corresponding polarity $\hat{p}(i_0, j_0)$. Then, proceed to successive coefficients by modifying only those which will not affect the polarities of the previous-processed coefficients.

In order to improve the invisibility, the polarity should be computed for absolute value of the coefficients so that the sign (plus and minus signs) of the coefficients are preserved to reduce the changes introduced by modification. Further, in order to survive JPEG lossy compression, the quantization effect utilized in the JPEG codec must be considered. FIG. 8A and FIG. 8B shows the suggested luminance quantization table for the JPEG standard, which usually causes perceptible artifacts when viewed on high-quality displays. FIG. 8B shows another quantization table used in most JPEG software such as the one used by Image Alchemy, Handmade Software, Inc. The values are almost half of the corresponding JPEG suggested quantization values. Based on a referenced quantization table, the polarities are computed from coefficients after quantization and then dequantization. Therefore, in case of quantization attack, the correct marked pixel should be extracted. That is, the polarity should be $$p\left(k \times \left(M_1 \times \frac{8}{N_1}\right) + i, l \times \left(M_2 \times \frac{8}{N_2}\right) + j\right) =$$

$$\begin{cases} 1, & \text{if } \left[\frac{\left|y_r\left(k \times \left(M_1 \times \frac{8}{N_1}\right) + i, l \times \left(M_2 \times \frac{8}{N_2}\right) + j\right)\right|}{Q(i, j)}\right] Q(i, j) > \\ & \left[\frac{\left|y_r\left((k-1) \times \left(M_1 \times \frac{8}{N_1}\right) + i, (l-1) \times \left(M_2 \times \frac{8}{N_2}\right) + j\right)\right|}{Q(i, j)}\right] Q(i, j) \\ 0, & \text{otherwise,} \end{cases}$$

where Q(i, j) is the quantization value at the corresponding position (i, j).

(b) Embedding Into the Relationship Within Each Block:

In order to overcome the technical challenges addressed above, while not propagating the modifications into the neighboring blocks (so as to improve the invisibility), the relatively more reliable DC coefficient (instead of the middle-frequency coefficients of neighboring blocks) is used as a reference value for each block. That is, $$P = \text{Polarity }(Y_r)$$

$$P = \left\{ p\left(k \times \left(M_1 \times \frac{8}{N_1}\right) + i, l \times \left(M_2 \times \frac{8}{N_2}\right) + j\right),\right. \tag{14}$$

$$0 \le k < \frac{N_i}{8}, 0 \le l < \frac{N_2}{8}, 0 \le i < \left(M_1 \times \frac{8}{N_1}\right), 0 \le j <$$

$$\left.\left(M_2 \times \frac{8}{N_2}\right)\right\}$$

where $$p\left(k \times \left(M_1 \times \frac{8}{N_1}\right) + i, l \times \left(M_2 \times \frac{8}{N_2}\right) + j\right) = \tag{15}$$

$$\begin{cases} 1, & \text{if } \left[\frac{\left|y_r\left(k \times \left(M_1 \times \frac{8}{N_1}\right) + i, l \times \left(M_2 \times \frac{8}{N_2}\right) + j\right)\right|}{Q(i, j)}\right] Q(i, j) > \\ & \left[\frac{|y(k \times 8, l \times 8)|}{\text{scale\_factor} \times Q(0, 0)}\right] Q(0, 0) \\ 0, & \text{otherwise.} \end{cases}$$

For each marked pixel, add (or subtract) the corresponding coefficient so that the modified coefficients $\hat{Y}_r$ will have the reverse polarity $\hat{P}$.

Step S50: IDCT Transformation:

Finally, map the modified middle-frequency coefficients $\hat{Y}_r$ into Y to get $\hat{Y}$. Then, inverse DCT (IDCT) of the associated result to obtain the watermarked image.

$$\hat{X} = IDCT(\hat{Y})$$

(2). Watermark Extracting Steps Shown in FIG. 6A and FIG. 6B

Figure 6A:
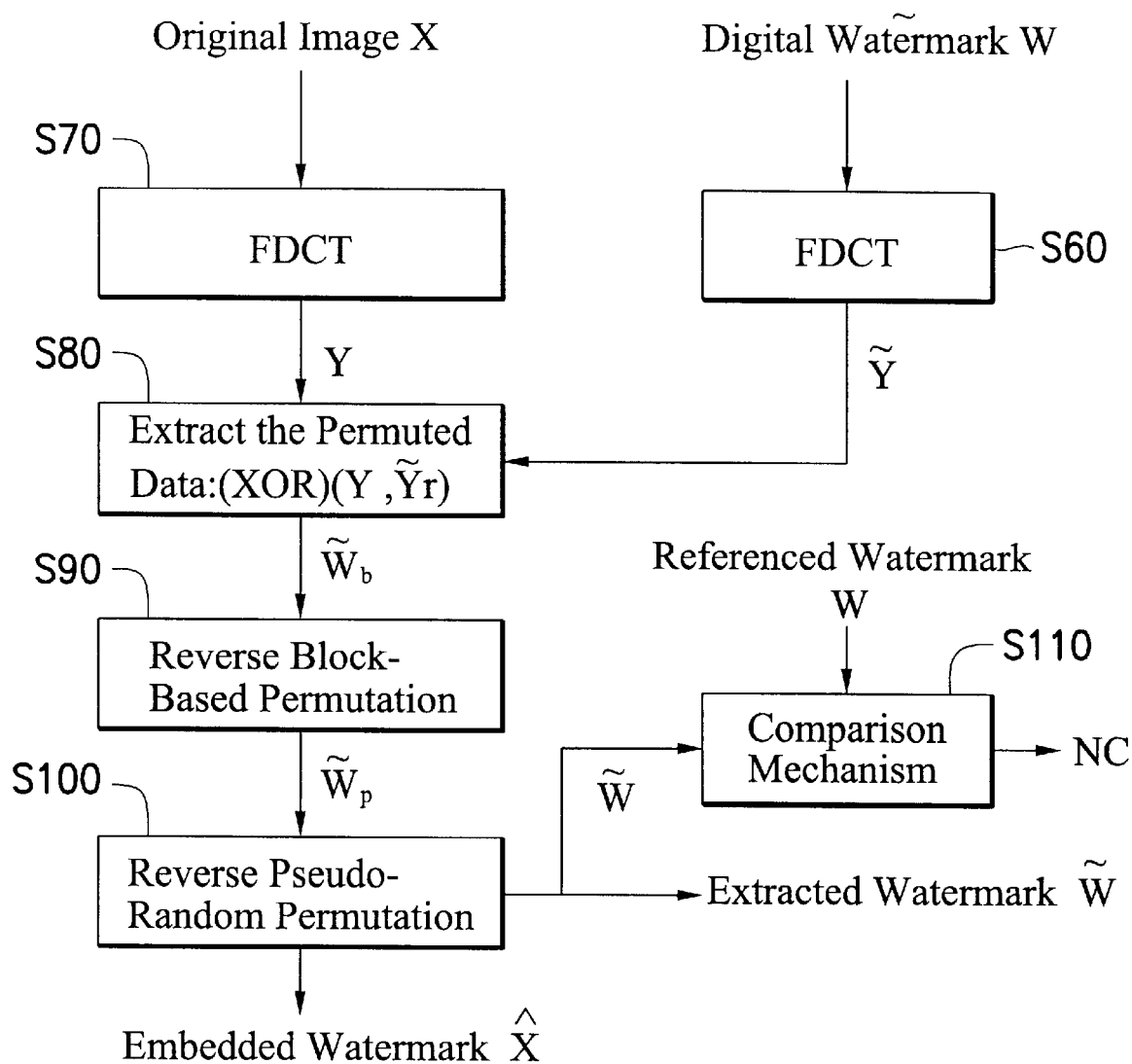
FIG. 6A and FIG. 6B illustrate the steps of detecting the watermark from a suspected image according to another embodiment of the present invention.
Figure 6B:
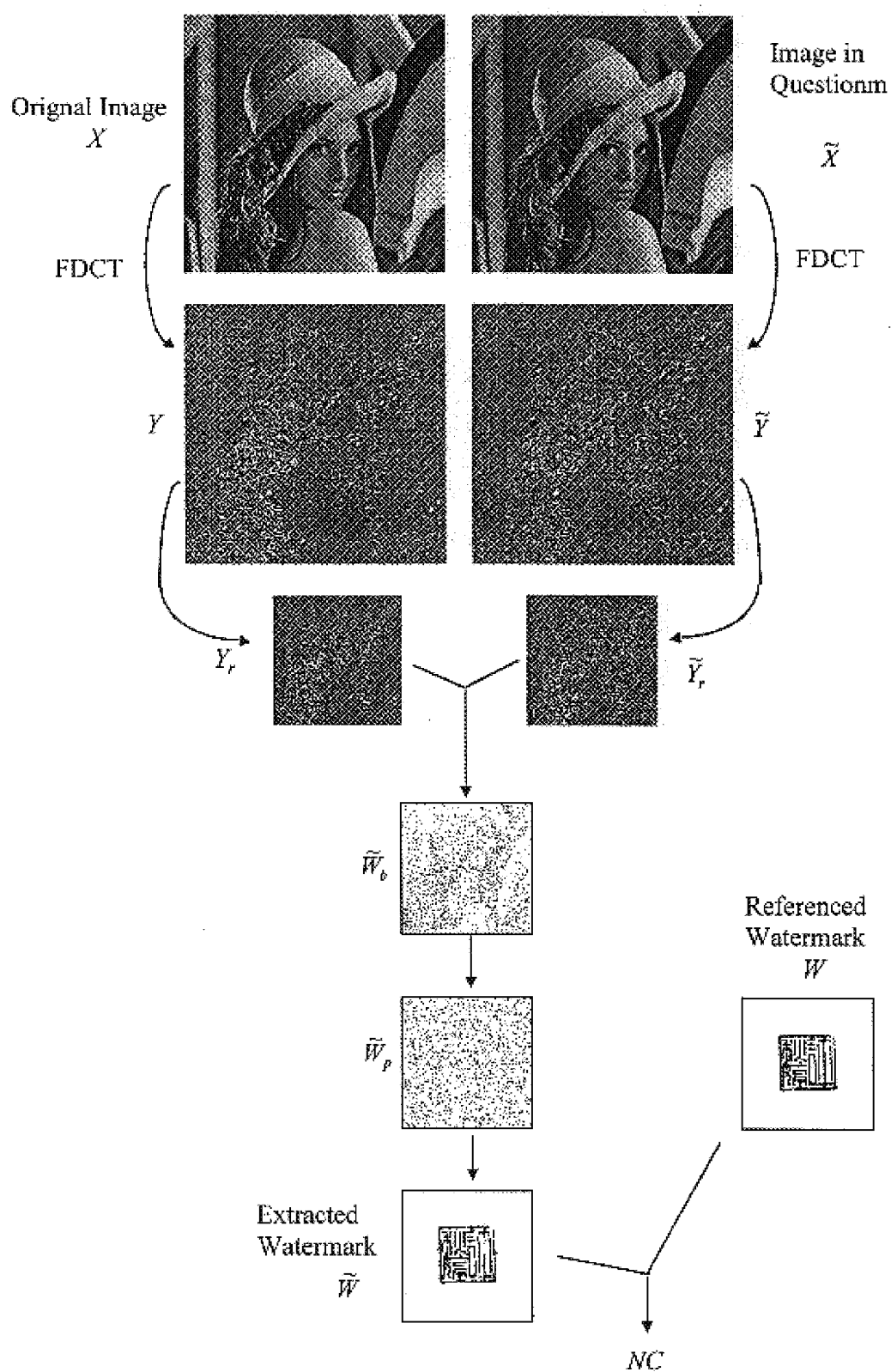

Accordingly, it is another object of the present invention to provide a method of extracting hidden digital watermarks in images. In this embodiment, as shown in FIG. 6A and FIG. 6B, the extraction of watermark requires the original image, the watermarked image, and either the watermark or the permutation mapping used in image-dependent permutation during the embedding steps. The extraction steps are described as follows.

Step S60/S70: FDCT Transformation:
Block Transformation:
Both the original image X and the image in question $\hat{X}$ are DCT transformed.

$$Y=FDCT(X)$$

$$\tilde{Y}=FDCT(\tilde{X})$$

Generation of Polarity Patterns:
Generate the reduced images which contain only the middle-frequency coefficients and then use these middle-frequency DCT coefficients to produce the polarity patterns. That is, $$Y_r=Reduce(Y),$$

$$\tilde{Y}_r=Reduce(\tilde{Y}),$$

and then $$P=Polarity(Y_r)$$

$$\tilde{P}=Polarity(\tilde{Y}_r).$$

Step S80: Extract the Permuted Data:
Perform exclusive-or (XOR) operation on these two polarity patterns to obtain a permuted binary data, i. e., $$\tilde{W}_b=XOR(P, \tilde{P})$$

where $\tilde{w}_b(i, j)=p(i, j)\oplus\tilde{p}(i, j)$.

Step S90: Reverse Block-Based Image-Dependent Permutation:
The image-dependent permutation mapping could be obtained either by saving as a file during the embedding steps or re-computed from the original image and the watermark. Based on the mapping, reverse permute $\tilde{W}_b$ to get $\tilde{W}_p$ Step S100: Reverse Pseudo-Random Permutation:
Reverse-permute $\tilde{W}_p$ to get the watermark $\tilde{W}$, $$\tilde{w}(i, j)=\tilde{w}_p(i', j')$$

where (i', j') is reverse-permuted to (i, j) according to the predefined pseudo-random order.

(3). Similarity Measurement

In this embodiment, the extracted watermark is an visually recognizable pattern. The viewer can compare the results with the referenced watermark subjectively. However, the subjective measurement is dependent on factors such as the expertise of the viewers, the experimental conditions, etc. Therefore, a quantitative measurement is needed to provide objective judgment of the extracting fidelity. We define the similarity measurement between the referenced watermark W and extracted watermark $\tilde{W}$ as:

$$\text{Normalized Correlation } (NC) = \frac{\sum_i\sum_j W(i, j)\tilde{W}(i, j)}{\sum_i\sum_j [W(i, j)]^2},$$

which is the cross-correlation normalized by the reference watermark energy to give unity as the peak correlation.

Accordingly, the advantages of embedding the digital watermarks into the original images of the present invention are listed as follows:

(a) resistant to image manipulation and processing operation, e.g., cut-and-paste, filtering, etc;

(b) perceptually invisible, i.e., the watermark does not render visible artifact;

(c) statistically undetectable;

(d) extracted digital watermarks as visually recognizable patterns for quick identification;

(e) adjustable image quality with the trade-off of watermark processing efficiency depending on the needs of the user.

(f) A "user key" providing as a secret key that can be used to serve various embedding processes by using the same embedding technology while being treated as a parameter during the extracting steps; wherein, the "user key" defines a seed of the pseudo-random number generator that in turn defines the initial position of an pseudo-random permutation, choice of middle-frequency coefficients, and mapping of the chosen coefficients into a reduced block.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A method of embedding hidden digital watermarks in images, comprising the steps of:

(a) providing an original image and a watermark image, wherein the watermark image, wherein the watermark image is a binary image with visually recognizable patterns;

(b) applying pseudo-random permutations to the watermark image for generating a dispersed watermark image;

(c) applying block-based permutations to both the original image and the dispersed watermark image to form a plurality of original image blocks each with a corresponding dispersed water mark block according to a variance value of each original image block and an information amount of each dispersed watermark block;

(d) applying FDCT (Forward Discrete Cosine Transform) on each of the original image blocks independently so that each of the original image blocks is transformed into a DCT coefficient block;

(e) embedding the correspond dispersed watermark blocks into the DCT coefficient blocks corresponding to a predetermined frequency range to form a plurality of combined DCT coefficient blocks; and (f) applying IDCT (Inverse Discrete Cosine Transform) to the combined DCT coefficient blocks to form an embedded watermark image.

2. The method as claimed in claim 1, wherein the dispersed watermark blocks are generated by pixels such that each pixel represents a set value of "0" or "1".

3. The method as claimed in claim 2, wherein the block-based permutation operates by dispersing pixels of each watermark block having he value of "1" over the corresponding original image block.

4. The method as claimed in claim 1, wherein the step (e) further comprise a the steps of:
  (a) selecting the DCT coefficient blocks within the predetermined frequency range from the original image blocks as reduced image blocks;
  (b) embedding the dispersed watermark blocks into the reduced image blocks; and
  (c) mapping the reduced image blocks back in to the original image blocks in order to form the combined DCT coefficient blocks.

5. The method as claimed in claim 4, wherein the predetermined frequency range is a middle-frequency range.

6. The method as claimed in claim 5, wherein when a DCT coefficient corresponding to the middle-frequency range of one of two neighboring reduced image blocks is bigger than the DCT coefficient corresponding to the middle-frequency range of the other reduced image block, a polarity value of the reduced image block having the bigger DCT coefficient is set at value "1".

7. The method as claimed in claim 6, wherein when the DCT coefficient corresponding to the middle-frequency range of one of two neighboring reduced image blocks is smaller than the DCT coefficient corresponding to the middle-frequency range of the other reduced image block, the polarity value of the reduced image block having the smaller DCT coefficient is set at value "0".

8. The method as claimed in claim 7, wherein the polarity value is set by performing exclusive-or (XOR) operation thereon.

9. The method as claimed in claim 7, wherein before the dispersed watermark blocks are embedded into the reduced image blocks, the step (e) further comprises the step of reversing the polarity value in order to modify the DCT coefficients corresponding to the middle-frequency range.

10. The method as claimed in claim 1, wherein the DCT coefficient blocks comprise DCT coefficient blocks of high-frequency range, middle-frequency range, and low-frequency range.

* * * * *